United States Patent [19]

Kuo

[11] Patent Number: 5,196,981

[45] Date of Patent: Mar. 23, 1993

[54] ESD PROTECTION SCHEME

[75] Inventor: James R. Kuo, Cupertino, Calif.

[73] Assignee: National Semiconductor Corporation, Santa Clara, Calif.

[21] Appl. No.: 635,874

[22] Filed: Dec. 28, 1990

[51] Int. Cl.[5] .............................................. H02H 9/04
[52] U.S. Cl. ..................................... 361/56; 361/91; 361/111; 257/356
[58] Field of Search ................. 361/54, 56, 91, 111; 357/23.13; 307/296.4, 542, 544, 549

[56] References Cited

U.S. PATENT DOCUMENTS

| | | | |
|---|---|---|---|
| 4,066,918 | 1/1978 | Heuner et al. | 361/91 |
| 4,151,480 | 4/1979 | Carlson et al. | 330/277 |
| 4,870,530 | 9/1989 | Hurst et al. | 361/91 |
| 4,897,757 | 1/1990 | Tailliet et al. | 361/91 |
| 5,010,380 | 4/1991 | Avery | 357/23.13 |
| 5,034,845 | 7/1991 | Murakami | 361/56 |

*Primary Examiner*—Todd E. DeBoer
*Attorney, Agent, or Firm*—Limbach & Limbach

[57] ABSTRACT

An energy dissipation circuit for protecting a semiconductor integrated circuit from electrostatic discharge (ESD). The dissipation circuit provides an energy dissipation path between any combination of two pins of the semiconductor integrated circuit to be protected.

3 Claims, 2 Drawing Sheets

ESD PROTECTION SCHEME

BACKGROUND OF THE INVENTION

1. Field of the Invention

The present invention relates to circuitry for protecting an integrated circuit against electrostatic discharge (ESD).

2. Discussion of the Prior Art

Electrostatic discharge (ESD) in semiconductor integrated circuits is a well-known problem. The inadvertent presence of a sudden voltage spike in an integrated circuit can cause physical destruction of circuit features. For example, ESD-induced spikes can rupture the thin gate oxides of field effect transistors.

The most common source of ESD stress is user handling of integrated circuit devices, particularly during testing. The human body can accumulate a static electric charge as high as 2000V, an amount of charge that can easily rupture gate oxide or other circuit features.

FIG. 1 shows an integrated circuit device having a number of input pads AoAn and a number of output pads BoBn. An example of an integrated circuit having this general architecture is a multi-channel transceiver.

A common ESD protection scheme for integrated circuits of the type shown in FIG. 1 is to simply insert diodes that clamp the input line of interest to supply (diodes D175, D176 and 177 in FIG. 1) and ground (Schottky diodes Q155, Q156, Q157 and Q167, Q168, Q169 and Q171 in FIG. 1). However, this scheme fails to protect the testing input while other inputs are grounded.

In some circuits, multiple grounds are employed, for example, in some multi-channel transceivers. Also, quite often a power output transistor which carries very high current requires separate ground return to avoid ground bouncing and overall device stability problems. Under these circumstances, the conventional shunt diode ESD scheme shown in FIG. 1 will not protect the device from this over-stressed transient voltage.

SUMMARY OF THE INVENTION

The present invention provides energy dissipation circuitry for protecting a semiconductor integrated circuit from electrostatic discharge (ESD). The dissipation circuitry, when utilized in conjuction with the conventional shunt diode ESD protection scheme, provides an energy dissipation path between a source of inadvertent high voltage and a ground connection, such that the path avoids the circuit to be protected, regardless of which lines of the circuit to be protected are grounded when the spike occurs.

In one embodiment of the invention, the energy dissipation circuitry includes an NPN bipolar transistor connected between a supply voltage source for the circuit to be protected and logic ground. A Zener diode connected in series with a resistor divider is connected between the supply and ground, the resistor divider providing base drive to the NPN transistor. A reverse-current path Schottky diode is connected between the supply and logic. In addition, a back-to-back Schottky diode pair is always connected between a supply pad of the IC to be protected and a ground pad of the circuit to be protected.

A better understanding of the features and advantages of the present invention will be obtained by reference to the following detailed description and accompanying drawings which set forth an illustrative embodiment in which the principles of the invention are utilized.

DETAILED DESCRIPTION OF THE INVENTION

Figure 2:
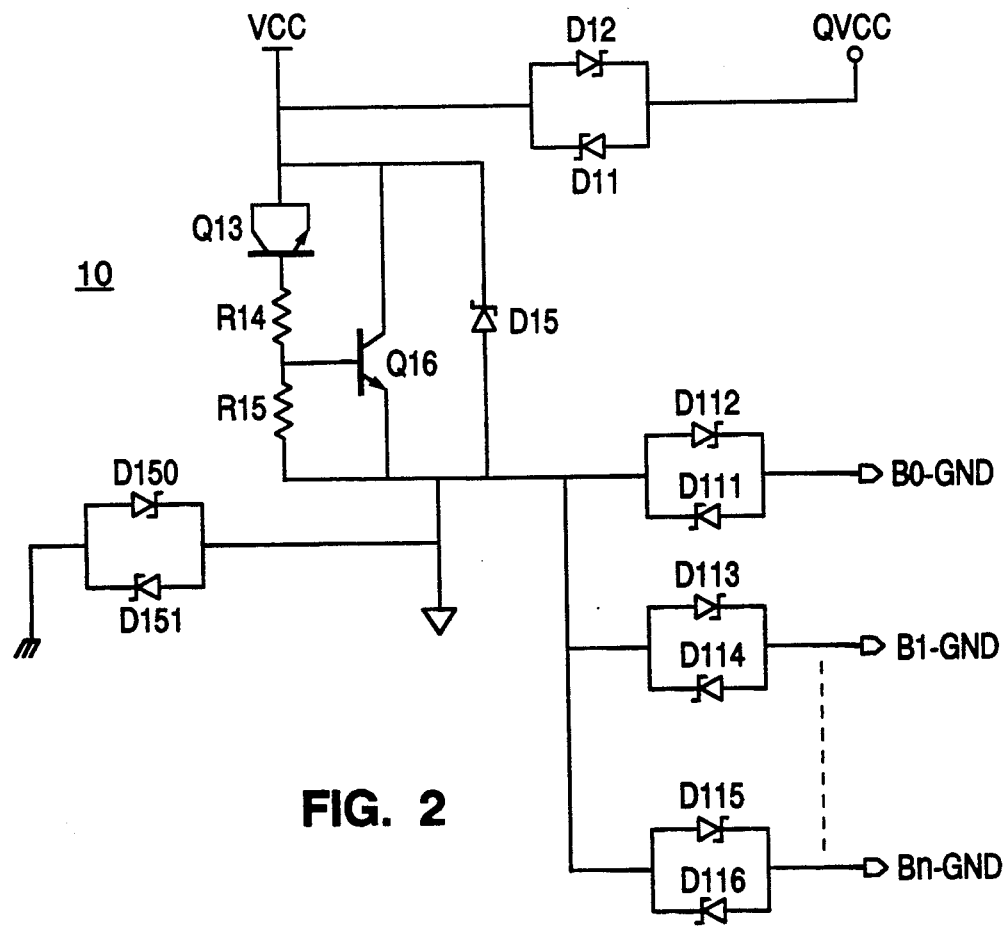
FIG. 2 is a schematic diagram illustrating an ESD protection circuit in accordance with the present invention utilizable in conjunction with the FIG. 1 shunt diode scheme.

FIG. 2 shows an energy dissipation circuit 10 in accordance with the present invention that can be used in bipolar or biCMOS integrated circuit devices to provide electrostatic discharge (ESD) protection against voltage stress spikes of up to 3.5Kv–4.0Kv.

The energy dissipation circuit 10 includes a large NPN bipolar transistor Q16 (60×4 emitter) connected between supply Vcc and logic ground. A small Zenor diode Q13 ($V_{EBO}=V_Z\approx6.5V$) connected in series with a resistor divider consisting of 2X resistor R14 and 1X resistor R15 is also connected between supply Vcc and logic ground, the resistor divider R14/R15 providing base drive to the NPN transistor Q16. A reverse-current path, 30×60 gardring Schottky diode D18 is also connected between supply Vcc and logic ground.

The breakdown voltage $V_B$ of the above-described network within dissipation circuit 10 is $$V_B = V_Z + (2 + 1)V_{BE}$$
$$= 6.5\text{ V} + 2.1\text{ V}$$
$$= 8.6\text{ V}$$

which is well above the standard maximum supply Vcc of 6.5V.

Of course, the value of the breakdown voltage $V_B$ can be adjusted by varying the ratio of resistors R14 and R15.

Figure 3:
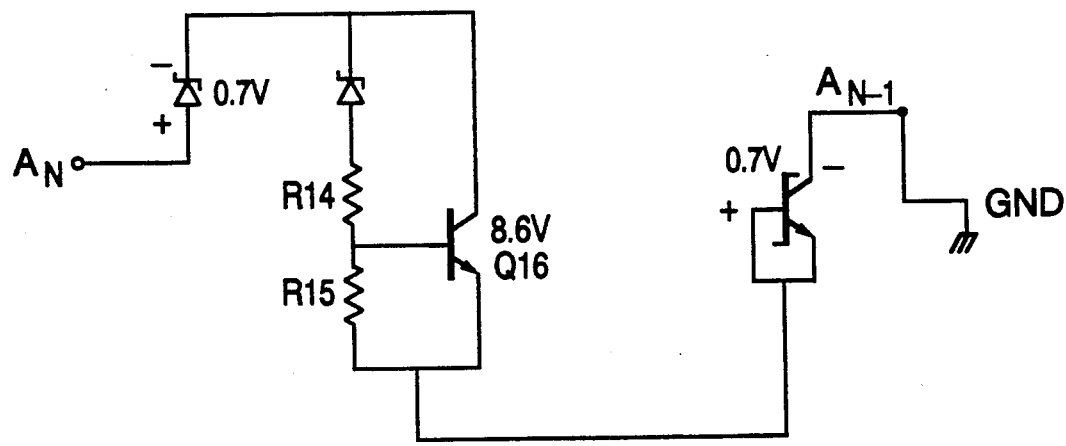
FIG. 3 is a schematic diagram illustrating an example of an energy dissipation path provided by a dissipation circuit in accordance with the present invention.

As shown in FIG. 2, the dissipation circuit 10 also includes back-to-back paired Schottky diodes (60×40 mil each) connected between any two ground pads of the circuit to be protected. Similarly as shown in FIG. 2, back-to-back Schottky diodes are also connected between circuit. The logic ground is tied to the device substrate. Each of the other grounds, i.e. BTL GNDS (BG0, BG1, . . . BG8) and quiet ground QEND, is internally connected to logic ground through a back-to-back Schottky pair. That is, as shown in FIG. 3, Schottky pair D150, D151 is connected between quiet ground QVss and logic ground; Schottky pair D111, D112 is connected between logic ground and ground B0_gnd; Schottky pair D113, D114 is connected between is connected between logic ground and ground B1_gnd; and Schottky pair D115, D116 is connected between logic ground B8_gnd. Similarly, supply Vcc is connected to supply QVcc by Schottky pair D11, D12.

Figure 1:
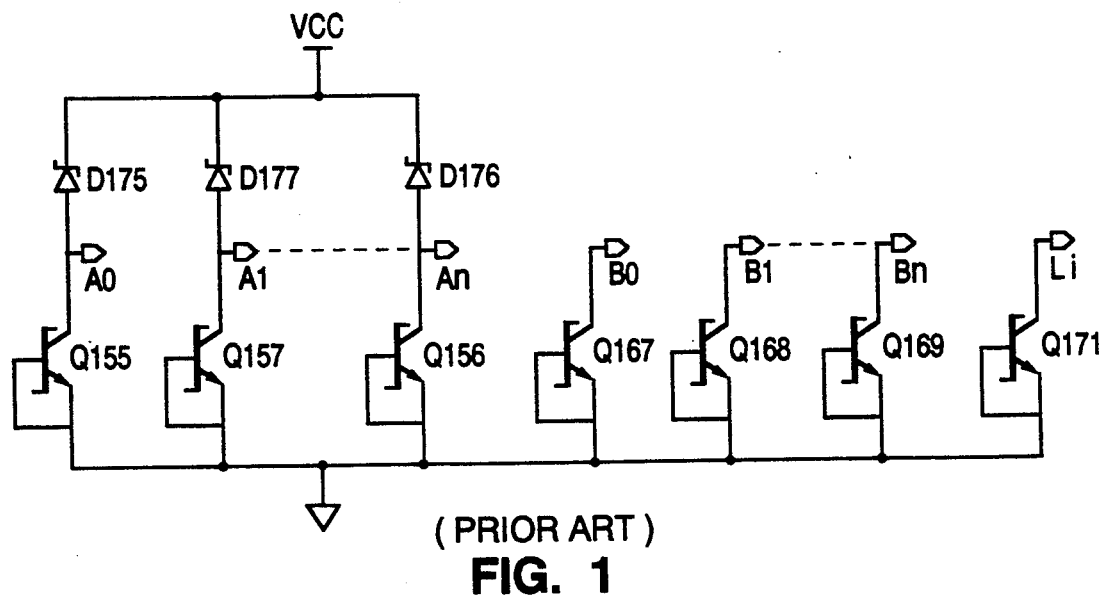
FIG. 1 is a schematic diagram illustrating a conventional ESD protection scheme utilizing shunt diodes.

Using the dissipation circuitry 10 in conjuction with the FIG. 1 circuit, in a first example of providing a dissipation path in accordance with the present invention, with any combination of inputs $A_N$ tied to ground and one of the inputs $A_1$ for example judner test, a high stress ESD voltage appearing on input $A_1$, will follow an energy dissipation path through diode D177 in FIG. 1 to supply Vcc. This causes the resistor divider R14/R15 in the dissipation circuit 10 (FIG. 2) to provide sufficient drive to turn NPN transistor P16 on, thus clamping input line $A_1$ at 10V.

That is, as shown in FIG. 3, with input $A_1$ grounded, an over-stress voltage applied to input $A_n$ will be clamped to $$V_{SO}+V_B+V_{S1}=0.7+8.6+0.7=10V$$

where $V_{SO}$ = voltage drop across diode D175
$V_{S1}$ = voltage drop across Schottky diode Q157.

Figure 4:
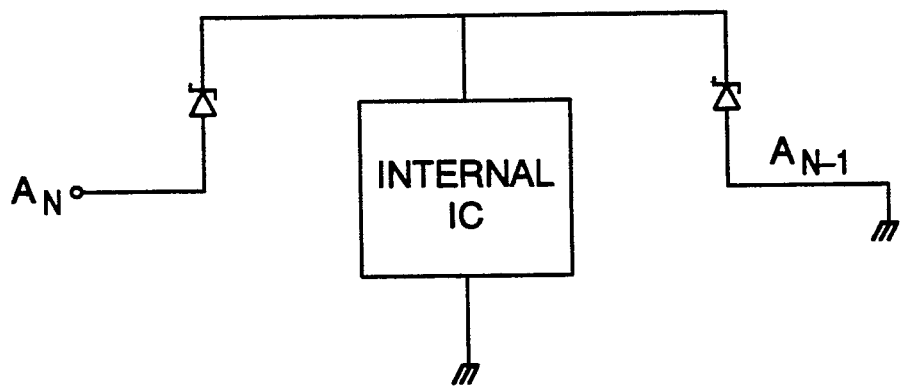
FIG. 4 is a schematic diagram illustrating circuit breakdown utilizing a conventional ESD protection energy dissipation path provided by a dissipation circuit in accordance with the present invention.

Again, using the circuitry 10 in conjuction with the FIG. 1 circuit, in a second example, the FIG. 1 circuit shows multiple output ground paths. As shown in FIG. 4, without utilization of energy dissipation circuit IO an over-stress voltage applied to an input $A_N$ can cause breakdown between Vcc to ground through the weakest circuit path. This kind of breakdown is circuit process dependant and not predictable.

Figure 5:
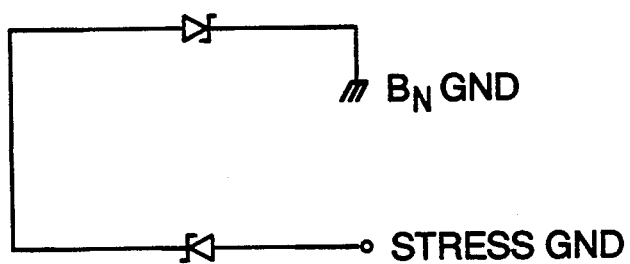
FIG. 5 is a schematic diagram illustrating connection of DTL GND to STRESS GND.

In accordance with the invention, utilization of the dissipation circuit 10, as shown in FIG. 5, with one of the outputs (e.g., Bn) grounded, a stress voltage applied to any one of the remaining output grounds will be clamped to $2V_s$, i.e., 2 Schottky diode forward drops.

In a third example, if the supply Vcc is grounded and stress-voltage is applied to a Bn ground line, e.g. B∅, then the dissipation path is through the diode D111 of the associated Schottky pair (D111, D112) and through the reverse-path Schottky diode D18 to supply Vcc.

In summary, further analysis of the dissipation circuit 10 in conjunction with the FIG. 1 circuit will show that the present invention always provides an energy dissipation path between any combination of two pads of an integrated circuit to be protected.

It should be understood that various alternative to the embodiments of the invention described herein may be employed in practicing the invention. It is intended that the following claims define the scope of the invention and that methods and apparatus within the scope of these claims and their equivalents be covered thereby.

What is claimed is:

1. An improved energy dissipation circuit for protecting an integrated circuit that includes a primary functional circuit, a plurality of input pins connected to provide input signals to the primary functional circuit, and a plurality of output pins connected to provide output signals from the primary functional circuit, the energy dissipation circuit including a primary shunt diode protection circuit that includes, for each input pin, a supply diode connected between said input pin and a positive supply and a ground diode connected between said input pin and logic ground, the primary shunt diode protection circuit further including, for each output pin, an output diode connected between said output pin and logic ground, the improvement comprising a secondary energy dissipation circuit connected between the positive supply and logic ground and operative in conjunction with the primary shunt diode protection circuit to provide an energy dissipation path between any combination of an input pins and output pins and wherein the energy dissipation path includes elements of only the primary shunt diode protection circuit and the secondary energy dissipation circuit whereby a voltage spike having a voltage greater than a preselected limit and applied at one of the input pins or one of the output pins is not applied to the primary functional circuit, said primary functional circuit includes a plurality of ground logic output pads connected between the primary functional circuit and logic ground, and wherein the secondary energy dissipation circuit comprises:
   (a) an NPN bipolar transistor connected between the positive supply and ground;
   (b) a Zenor diode connected in series with a resistor divider connected between the positive supply and logic ground such that the resistor divider provides a drive signal to the base of the NPN transistor;
   (c) a reverse-current path Schottky diode connected between the positive supply and logic ground; and
   (d) a plurality of inverse parallel Schottky diode paris, one such Schottky diode pair being connected between an associated ground logic output pad and logic ground.

2. An improved energy dissipation circuit as in claim 1 and wherein said plurality of Schottky diode pairs includes a supply Schottky diode pair connected between the positive supply and a quiet positive supply.

3. An improved energy dissipation circuit as in claim 2 and wherein the plurality of Schottky diode pairs includes a ground Schottky diode pair connected between logic ground and quiet logic ground.

* * * * *